(12) United States Patent
Li et al.

(10) Patent No.: US 8,233,949 B2
(45) Date of Patent: Jul. 31, 2012

(54) MOBILE PHONE

(75) Inventors: Xiong Li, Shenzhen (CN); Feng-Xiang Tang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 365 days.

(21) Appl. No.: 12/543,511

(22) Filed: Aug. 19, 2009

(65) Prior Publication Data

US 2010/0234070 A1 Sep. 16, 2010

(30) Foreign Application Priority Data

Mar. 13, 2009 (CN) .......................... 2009 1 0300814

(51) Int. Cl.
*H04M 1/00* (2006.01)
(52) U.S. Cl. ..................................... 455/575.4; 455/558
(58) Field of Classification Search .................. 455/551, 455/558, 550.1, 418, 552.1; 235/380, 451, 235/486, 379
See application file for complete search history.

(56) References Cited

U.S. PATENT DOCUMENTS

| | | | |
|---|---|---|---|
| 6,766,952 B2 * | 7/2004 | Luu | 235/451 |
| 2003/0153356 A1 * | 8/2003 | Liu | 455/558 |
| 2007/0129103 A1 * | 6/2007 | Al-Shaikh | 455/551 |

* cited by examiner

Primary Examiner — Kiet Doan
(74) Attorney, Agent, or Firm — Altis Law Group, Inc.

(57) ABSTRACT

A mobile phone switches the electrical connection between one of at least two SIM cards received in a slidable holder which is slidably received in a receiving groove having an electrical connector.

8 Claims, 5 Drawing Sheets

MOBILE PHONE

BACKGROUND

1. Technical Field

The present disclosure relates to mobile phones and, particularly, to a mobile phone capable of switching electrical connections with several different subscriber identity module (SIM) cards received therein.

2. Description of Related Art

Generally, a mobile phone connects to a mobile communication network system through a SIM card. The SIM card is typically coupled inside the mobile phone and covered by a back cover of the mobile phone. In reality, it is not uncommon for a user to have more than one SIM cards. However, current mobile phones typically provide only one internal socket for coupling one SIM card. Therefore, when one needs to change SIM cards, the back cover must be removed from the mobile phone first, before replacing the SIM card. This is inconvenient and very time-consuming.

Therefore, it is desirable to provide a mobile phone which can overcome the above-mentioned problems.

DETAILED DESCRIPTION

Figure 1:
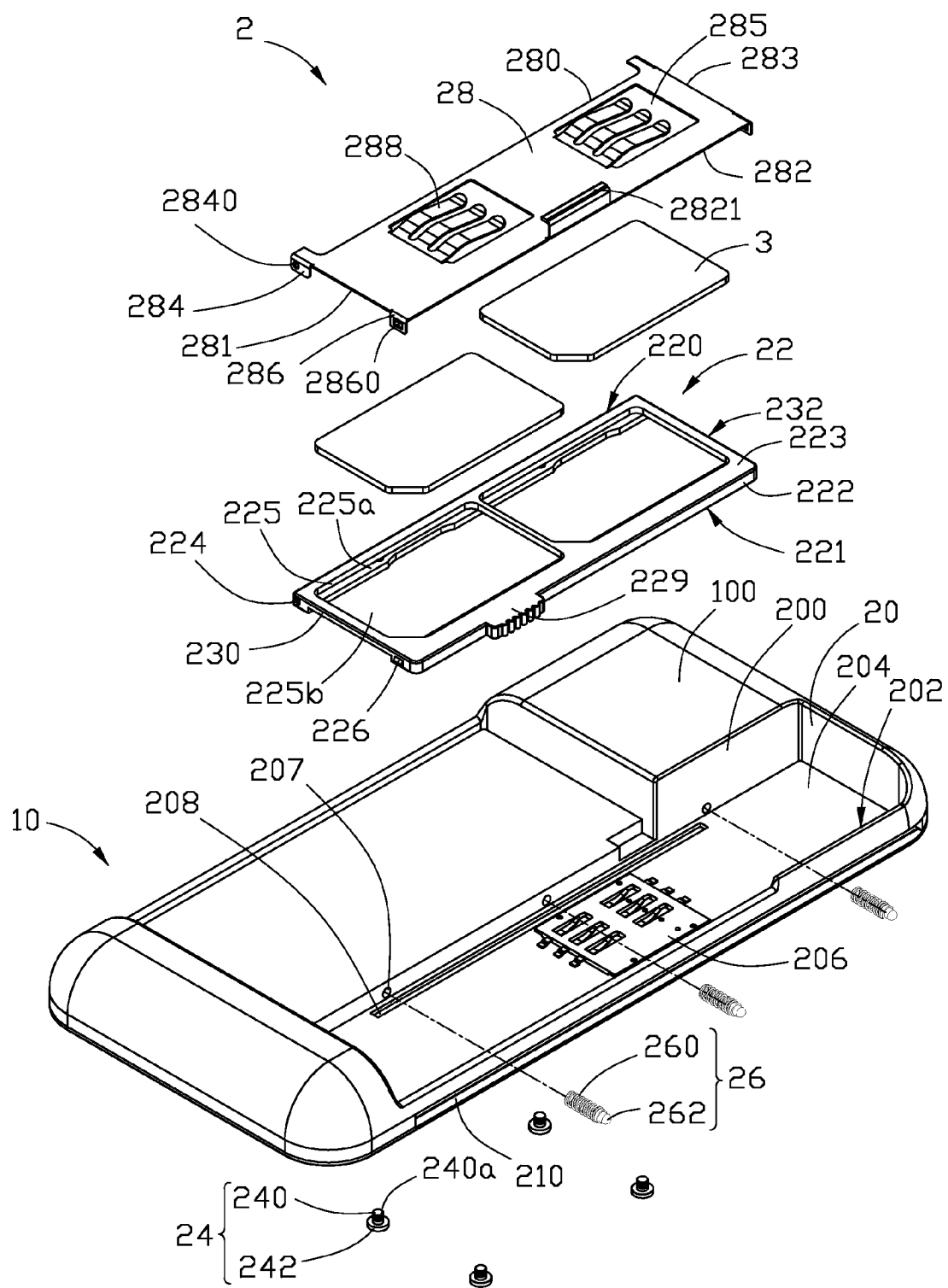
FIG. 1 is an exploded, isometric, schematic view of an exemplary embodiment of a mobile phone.
Figure 2:
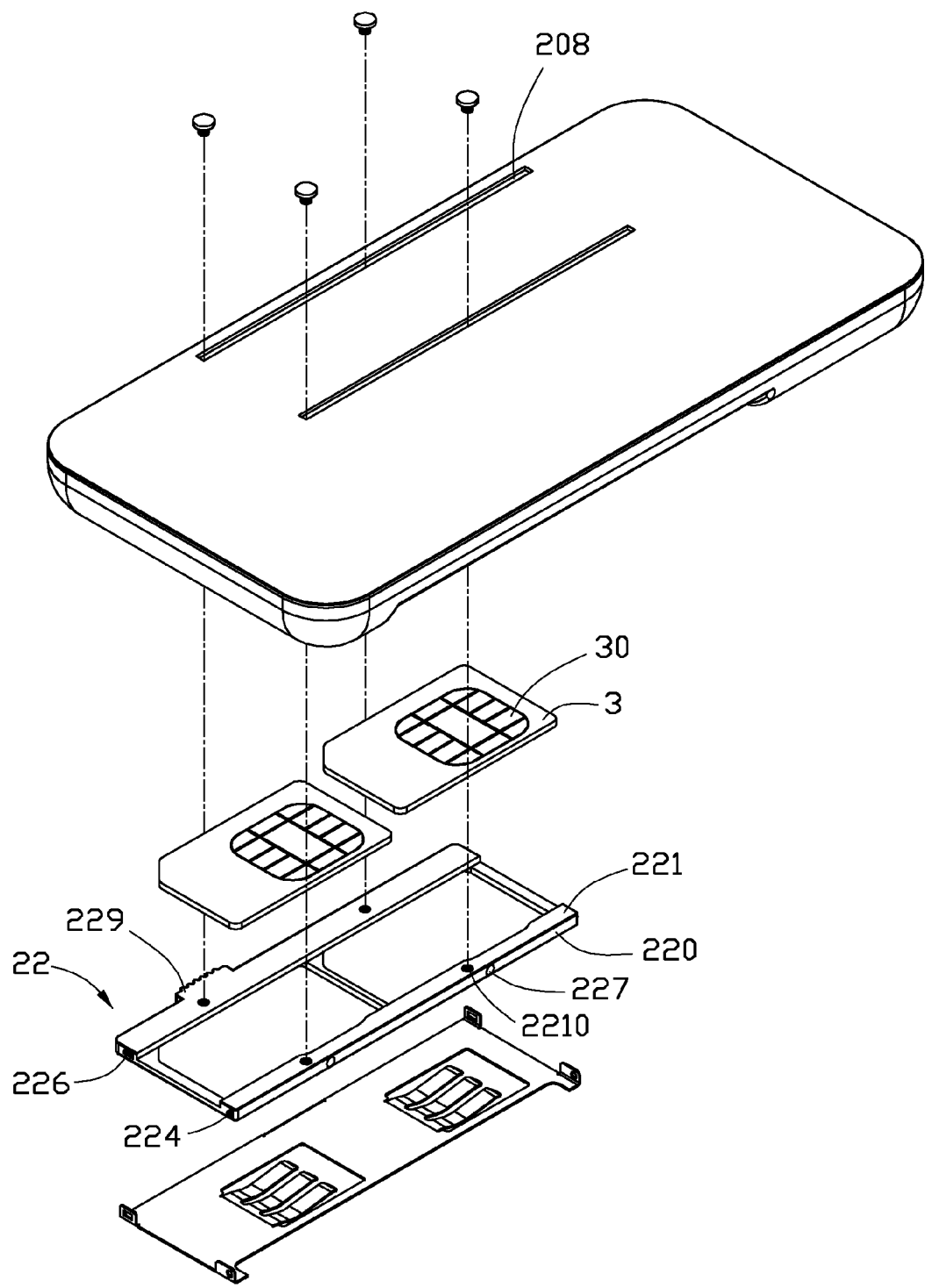
FIG. 2 is an exploded, isometric, schematic view the mobile phone of FIG. 1, viewed from another angle.

Referring to FIGS. 1-2, a mobile phone 2 in accordance with an exemplary embodiment is illustrated. The mobile phone 2 includes a base 10, a slidable holder 22, at least two SIM cards 3, a number of positioning members 26, a cover 28, and a number of fastening members 24. In this embodiment, there are two SIM cards 3, three positioning members 26, and four fastening members 24.

The base 10 is generally a rectangular in shape and includes a back surface 100. The base 10 defines a receiving groove 20 in the back surface 100. The receiving groove 20 defines a bottom surface 204, a first sidewall 200, a second sidewall 202 parallel to the first sidewall 200, and an electrical connector 206 (i.e., a SIM card socket). The electrical connector 206 is fixed on the bottom surface 204. The bottom surface 204 defines two sliding slots 208 parallel to the first sidewall 200 on opposite sides of the electrical connector 206. The first sidewall 200 defines a number of blind holes 207 for accommodating the positioning members 26. The blind holes 207 are aligned on a line parallel to the bottom surface at predetermined distances from each other. In this embodiment, there are three blind holes. The second sidewall 202 defines an elongated through hole 210 parallel to the first sidewall 200.

The slidable holder 22 is substantially a rectangular plate and includes an upper surface 223, a lower surface 221, a third sidewall 220, a fourth sidewall 222, a fifth sidewall 230, a sixth sidewall 232, a pushing member 229, a number of holding flanges 225a, two pivot shafts 224, and two latching protrusions 226. The lower surface 221 is parallel to the upper surface 223. The fourth sidewall 222 is parallel to the third sidewall 220. The fifth sidewall 230 perpendicularly connects the third sidewall 220 and the fourth sidewall 222. The sixth sidewall 232 is parallel to the fifth sidewall 232.

The slidable holder 22 defines at least two receiving through holes 225b arranged on a line parallel to the third sidewall 220. The receiving through holes 225b each define an inner sidewall 225. The holding flange 225a perpendicularly extends from the inner sidewall 225 toward the center of the receiving through hole 225b.

The third sidewall 220 defines at least two positioning recesses 227 corresponding to each of the receiving through holes 225b (e.g., arranged on a line parallel to the third sidewall at predetermined intervals). The pushing member 229 perpendicularly extends outwards from the fourth sidewall 222 corresponding to one of the receiving through holes 225b. The pivot shafts 224 are aligned on a line parallel to and adjacent to the third sidewall, and, extend perpendicularly away from the fifth sidewall 230 and the sixth sidewall 220 correspondingly. The latching protrusions 226 are aligned on a line parallel to and adjacent to the fourth sidewall 222, and, extend perpendicularly away from the fifth sidewall 230 and the sixth sidewall 232 correspondingly. The lower surface 221 defines at least two fastening holes 2210 (e.g., threaded holes) corresponding to each of the sliding slots 208.

The cover 28 is substantially a rectangular sheet and includes a first edge 281, a second edge 283, a third edge 280, a fourth edge 282, a number of resilient prongs 288, a number of connecting portions 284, a number of fixing portion 286, and a handle 2821. The third edge 280 is substantially perpendicular to the first edge 281 and the second edge 283. The fourth edge 282 is parallel to the third edge 280.

The cover 28 defines at least two cutouts 285 corresponding to the receiving holes 225b. The resilient prongs 288 perpendicularly extend inwards from an edge of the cutouts 285 and each form a downward bending elbow. In this embodiment, there are three resilient prongs 288 extends inwards each cutout 285. The connecting portions 284 extend downwards, adjacent to the third edge 280, from the first edge 281 and the second edge 283, respectively. Each of the connecting portions 284 defines a pivot hole 2840 substantially in the center thereof. The fixing portions 286 extend downwards, adjacent to the fourth edge 282, from the first edge 281 and the second edge 283, respectively. Each of the fixing portions 286 defines a latch hole 2860 substantially in the center thereof. The handle 2821 extends upwards generally from the middle portion of the fourth edge 282.

Each positioning member 26 includes a spring 260 and a positioning block 262 connected to one end of the spring 260.

Each SIM card 3 includes an electrical connecting surface 30. The SIM card 3 is electrically coupled with the mobile phone 2 via the electrical connecting surface 30.

Figure 3:
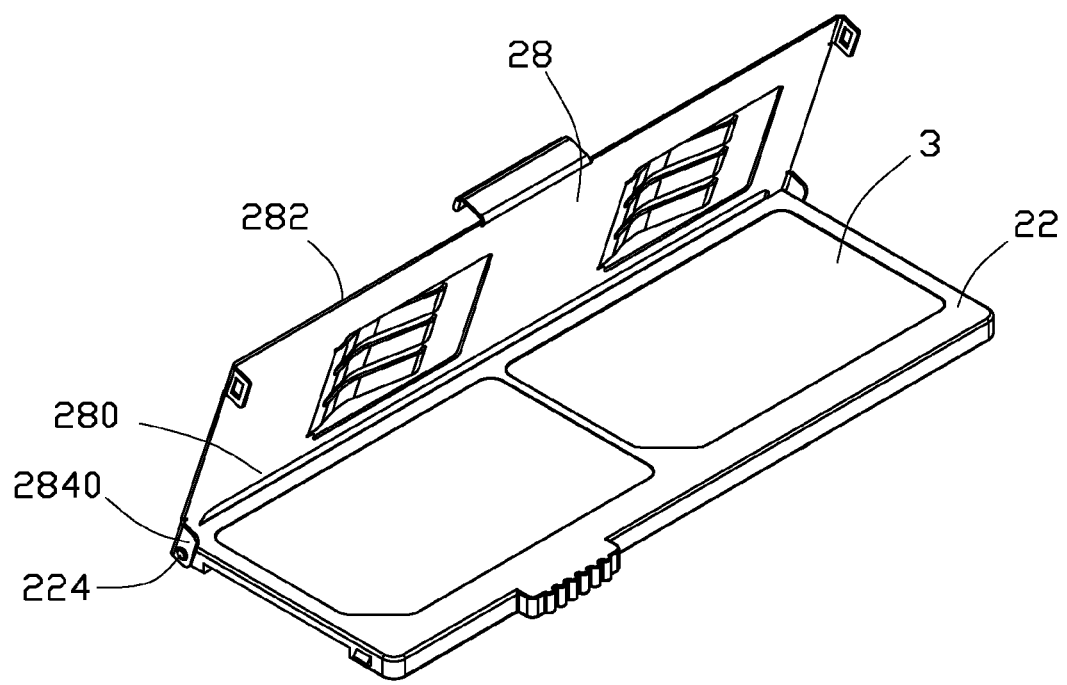
FIG. 3 is an isometric, schematic view of a slidable holder and a cover of the mobile phone of FIG. 1 when the cover is open.

Each fastening member 24 includes a threaded pole 240 and a positioning flange 242. The threaded pole 240 includes a threaded end 240a. The positioning flange 242 extends outwards from the periphery of the other end of the threaded pole 240 apart from the threaded end 240a Also referring to the FIG. 3, in assembly, the cover 28 is rotatably connected to the slidable holder 22 by inserting the pivot shafts 224 into the pivot holes 2840 correspondingly. As a result, the cover 28 is rotatable around the pivot shafts 224 by applying a force on the handle 2821. Each spring 260 is accommodated in one of the blind holes 207 with the positioning block 262 resiliently protruding out of the blind hole 207 into the receiving groove 20 correspondingly.

The slidable holder 22 is received in the receiving groove 20 with the positioning recesses 227 aligned with the positioning blocks 262. The pushing member 229 protrudes out of the receiving groove 20 at the elongated through hole 210. The fastening holes 2210 are aligned with the sliding slots 208. The slidable holder 22 is slidably received in the receiving groove 20. The threaded end 240a of the threaded pole 240 is passed through the sliding slot 208 and screwed into the fastening holes 2210 correspondingly. The positioning blocks 262 are inserted into the positioning recesses 227, thereby positioning the slidable holder 22. The electrical connector 206 is aligned with one of the receiving through holes 225b. The SIM cards 3 are disposed in the receiving through holes 225b with the electrical connecting surface 30 facing to the bottom surface 204 of the base 10 and positioned by the holding flanges 225a correspondingly.

Figure 4:
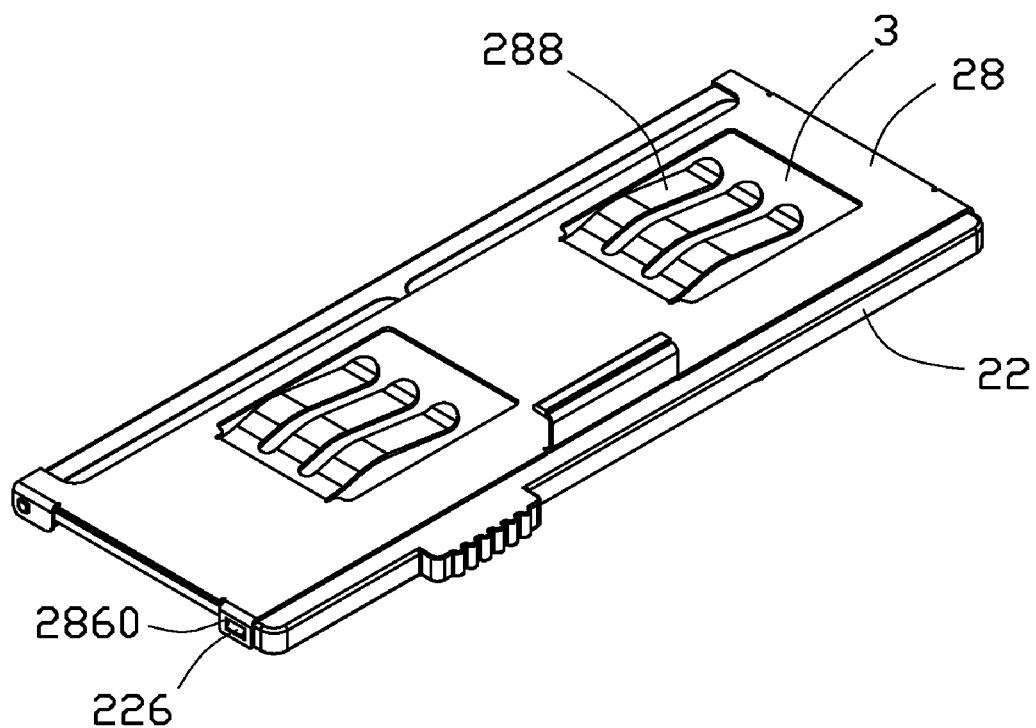
FIG. 4 is an isometric, schematic view of a slidable holder and a cover of the mobile phone of FIG. 1 when the cover is closed.

Also referring to FIG. 4, the cover 28 is folded and fastened to the slidable holder 22 by inserting the latching protrusions 226 into the latch holes 2860 correspondingly. The resilient prongs 288 of the cover 28 press the SIM cards 3 to prevent the electrical connection between the SIM cards 3 and the electrical connector 206 (see FIG. 1) from disconnecting.

Figure 5:
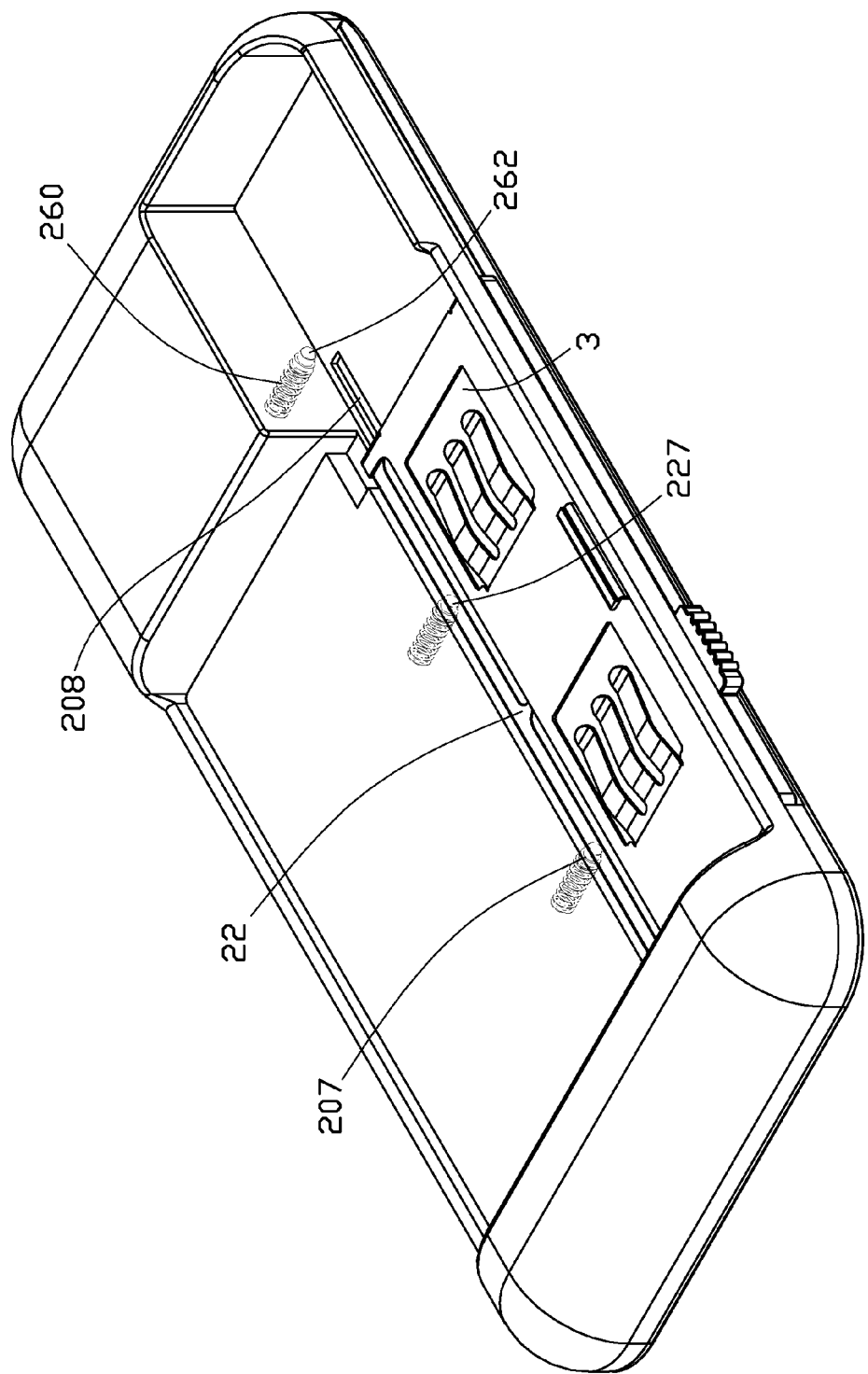
FIG. 5 is an assembled, isometric, schematic view of the mobile phone of FIG. 1.

In use, referring to FIG. 5, the SIM card 3 received in the slidable holder 22 is pressed by the resilient prongs 288 and closely connected to the electrical connector 206 (see FIG. 1). To switchover the SIM cards 3; the slidable holder 22 is slid along the sliding slots 208 by a force applied on the pushing member 229, thereby, pressing two corresponding positioning blocks 262 into the blind holes 207. When the slidable holder 22 is positioned in such a way that one of the SIM cards 3 electrically connects with the electrical connector 206, the positioning blocks 262 would be aligned with the blind holes 207 correspondingly, and as a result the positioning blocks 262 resiliently protrudes in the positioning recesses 227 correspondingly.

While various exemplary and preferred embodiments have been described, it is to be understood that the invention is not limited thereto. To the contrary, various modifications and similar arrangements (as would be apparent to those skilled in the art) are intended to also be covered. Therefore, the scope of the appended claims should be accorded the broadest interpretation so as to encompass all such modifications and similar arrangements.

What is claimed is:

1. A mobile phone for switching an electrical connection with one of at least two SIM cards, the mobile phone comprising:
    a base comprising a receiving groove, the receiving groove defining a bottom surface, a first sidewall, a second sidewall parallel to the first sidewall, the second sidewall defining an elongated through hole parallel to the first sidewall;
    an electrical connector fixed on the bottom surface of the receiving groove;
    two parallel sliding slots defined on the bottom surface of the receiving groove on opposite sides of the electrical connector;
    a slidable holder slidablely received in the receiving groove through the sliding slots, the slidable holder defining at least two receiving through holes arranged on a line for receiving the at least two SIM cards, the slidable holder being substantially a rectangular plate and comprising an upper surface, a lower surface parallel to the upper surface, a third sidewall, a fourth sidewall parallel to the third sidewall, a fifth sidewall perpendicularly connecting to the third sidewall and the fourth sidewall, a sixth sidewall parallel to the fifth sidewall, and a pushing member extending outwards from the fourth sidewall corresponding to one of the receiving through holes, the slidable holder being configured to slide along the sliding slots for switching the connection between one of the at least two SIM cards and the electrical connector.

2. The mobile phone as claimed in claim 1, further comprising a plurality of fastening members; each of the plurality of fastening members comprises a threaded pole and a positioning flange, the threaded pole comprises a threaded end, the positioning flange extending outwards from the periphery of the other end of the threaded pole apart from the threaded end; the lower surface defines at least two fastening holes corresponding to each of the sliding slots; the slidable holder is slidablely received in the receiving groove by the threaded end of the threaded pole passing through the sliding slots and screwing into the fastening holes.

3. The mobile phone as claimed in claim 1, further comprising a plurality of positioning members, each of the plurality of positioning members comprises a spring and a positioning block connected to one end of the spring, wherein the first sidewall defines a plurality of blind holes aligned on a line parallel to the bottom surface at predetermined distance from each other, each positioning member is accommodated in one of the blind holes and the positioning block protruding out of the blind hole into the receiving groove, the third sidewall defines at least two positioning recesses corresponding to the at least two receiving through holes; the positioning recesses are aligned with the blind holes when the slidable holder is received in the receiving groove, the aligned positioning blocks insert into the positioning recesses for positioning the slidable holder.

4. The mobile phone as claimed in claim 1, wherein the slidable holder is slidablely received in the receiving groove with the pushing member protruding out of the receiving groove via the elongated through hole, and one of the receiving through holes aligned with the electrical connector.

5. The mobile phone as claimed in claim 1, further comprising a cover for covering the slidable holder; the cover is substantially a rectangular sheet and comprises a first edge, a second edge parallel to the first edge, a third edge perpendicular to the first edge and the second edge, a fourth edge parallel to the third edge, and a handle extending upwards from the middle portion of the fourth edge.

6. The mobile phone as claimed in claim 5, wherein the cover further comprises a connecting portion extending downwards adjacent to the third edge, from the first edge and the second edge, respectively, each of the connecting portions defines a pivot hole substantially in the center thereof; the slidable holder further comprises a pivot shaft aligned on a same line adjacent the third sidewall, and, extending perpendicularly away from the fifth sidewall and the sixth sidewall, respectively; the cover is rotatably connected to the slidable holder by inserting the pivot shafts into the pivot holes.

7. The mobile phone as claimed in claim 5, wherein the cover further comprises a fixing portions extending downwards, adjacent to the third edge, respectively, from the first edge and the second edge, each of the fixing portions defines a latch hole substantially in the center thereof; the slidable holder further comprises a plurality of latching protrusions, corresponding to the plurality of fixing portions, aligned on a same line adjacent the fourth sidewall, and, extending perpendicularly away from the fifth sidewall and the sixth sidewall; the cover is folded and fastened to the slidable holder by inserting the latching protrusions into the latch holes.

8. The mobile phone as claimed in claim 5, wherein each of the SIM cards comprises an electrical connecting surface; each of the receiving through holes defines an inner sidewall, the slidable holder further comprises a plurality of holding flange extending outwards from the inner sidewall and toward the center of each receiving through hole; the SIM cards are disposed in the receiving through holes with the electrical connecting surface facing to the bottom surface of the base and positioned by the holding flange; the cover defines at least two cutouts corresponding to the at least two receiving through holes and further comprises a plurality of resilient prongs extending inwards the cutouts from an edge of the cutouts and forming a downward bending elbows, the SIM card received in the receiving hole is pressed by the resilient prongs to prevent the electrical connection between the SIM cards and the electrical connector from disconnecting.

* * * * *